UNITED STATES PATENT OFFICE 2,586,769

ALKYLTHIOSULFENYL DITHIOCARBAMATES AS VULCANIZATION ACCELERATORS

Chester M. Himel, Palo Alto, Calif., and Lee O. Edmonds, Bartlesville, Okla., assignors to Phillips Petroleum Company, a corporation of Delaware No Drawing. Application June 20, 1949,
Serial No. 100,293

18 Claims. (Cl. 260—79.5)

This invention relates to the vulcanization of rubberlike materials. In one aspect this invention relates to the vulcanization of natural rubber. In another aspect this invention relates to the vulcanization of synthetic rubbers. In a particular aspect this invention relates to the use of new and improved accelerators in vulcanization. This invention also relates to improved vulcanized products. This application is a continuation-in-part of our copending application, Serial No. 59,025, filed November 8, 1948, now Patent No. 2,572,845.

Accelerators for the vulcanization of rubber, both natural and synthetic, vary greatly in the rate of vulcanization produced, and the degree of cure that is attained. Accelerators used heretofore have either produced low rates of cure or, when high rates result, the product is susceptible to scorching or detrimental effects unless the temperature and other factors affecting cure are critically controlled. Moreover, many of the accelerators, especially those attaining high rates of cure, are sufficiently expensive to introduce a serious factor of cost into a highly competitive field.

We have now discovered a series of vulcanization accelerators which provide vulcanizates of preferred physical properties, reduce the curing time to a low minimum, and effect a high degree of economy, both from their low cost of production, and the usually small quantities required for optimum effect. The accelerators of our invention comprise alkylthiosulfenyl dithiocarbamates. These compounds may be produced by any means, but preferably by the interaction of an alkylthiosulfenyl halide containing not more than 16 carbon atoms per molecule with an alkali metal salt of an N-substituted dithiocarbamic acid according to the process disclosed in our copending application, Serial No. 59,025, filed November 8, 1948.

An object of this invention is to vulcanize rubber.

Another object of this invention is to produce a vulcanized rubber.

A further object of this invention is to produce rubber vulcanizates of superior physical characteristics.

Still another object of our invention is to effect a high rate of vulcanization of rubber.

A still further object is to provide selected alkylthiosulfenyl dithiocarbamates as accelerators for the vulcanization of rubber.

Further objects and advantages of our invention will become apparent, to one skilled in the art, from the accompanying discussion and disclosure.

The foregoing objects apply, collectively and severally, to natural rubber and to various synthetic rubbers. A generic term that has been applied to these materials is "a sulfur vulcanizable organic plastic substance containing unsaturated carbon to carbon bonds."

The preferred alkylthiosulfenyl dithiocarbamate accelerators of this invention comprise compounds of the formula

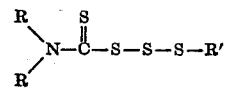

wherein each R is selected from the group consisting of hydrogen, hydrocarbon radicals, and radicals which together with the nitrogen form a heterocyclic ring, but with not more than one R being hydrogen, and R' is an alkyl radical. Preferably the total number of carbon atoms in the combined R's is not more than 20, and in R' is not more than 16. There are two parts of the thiosulfenyl dithiocarbamate molecule which can be varied, the $R_2N$-group and the —SSR' group. The nature of the $R_2N$-group is of major significance while the —SSR' group has much less effect as long as R' is an alkyl group. Most alkylthiosulfenyl dithiocarbamates wherein neither R is hydrogen give very satisfactory results as vulcanization accelerators, while those wherein one R is hydrogen, are generally less effective. However, compounds wherein one R is hydrogen should not be excluded from the scope of the invention, in its broadest forms. In addition to the structure of the $R_2N$-group, it appears that the molecular weight has an effect on the activity. A compound wherein each R is ethyl, or n-propyl is usually best suited for our purposes.

The amount of accelerator employed will vary, depending among other factors, upon the $R_2N$-group and upon the —SSR' group in the compound. The amount of accelerator used will generally be in the range between about 0.05 and about 5 parts, by weight, per 100 parts of rubber, with the amount usually ranging from 0.1 to 2 parts. When neither R is hydrogen, such as when each R is methyl, ethyl or n-propyl, the amount of accelerator required to produce the desired state of cure is much less than that necessary when $R_2N-$ is a heterocyclic ring such as in a morpholine or a piperidine thiosulfenyl dithiocarbamate. Thiosulfenyl dithiocarbamates containing a $(CH_3)_2N-$ and an $-SSR'$ group in which $R'$ is ethyl, isopropyl or tert-butyl show only slight differences in activity. Each is an exceptionally active accelerator. The accelerator compounds of our invention, in which $R'$ is tert-butyl are especially preferable since they exhibit an especially high degree of stability. Our most preferred compounds are those in which $R'$ contains from 4 to 7 carbon atoms. Typical of the accelerator compounds of our invention are N,N - dimethyl - S - tert - butylthiosulfenyl dithiocarbamate,

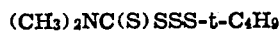

$(CH_3)_2NC(S)SSS-t-C_4H_9$

N,N - diethyl - S - tert - butylthiosulfenyl dithiocarbamate,

$(C_2H_5)_2NC(S)SSS-t-C_4H_9$

N,N - di - n - propyl - S - tert - butylthiosulfenyl dithiocarbamate,

$(n-C_3H_7)_2NC(S)SSS-t-C_4H_9$

Piperidine - S - tert - butylthiosulfenyl di-thiocarbamate,

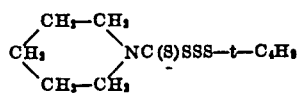

Morpholine - S - tert - butylthiosulfenyl dithiocarbamate,

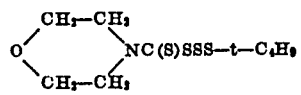

and

N,N - diethyl - S - tert - octylthiosulfenyl dithiocarbamate,

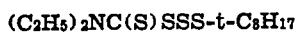

$(C_2H_5)_2NC(S)SSS-t-C_8H_{17}$

Other alkylthiosulfenyl dithiocarbamates of interest are those containing a branched $-SSR'$ group such as $-SS$-tert-amyl, $-SS$-tert-heptyl, and $-SS$-tert-dodecyl.

The quantity of alkylthiosulfenyl dithiocarbamate accelerator employed will vary, depending on the compounding recipe employed, the particular alkylthiosulfenyl dithiocarbamate used, the properties of the vulcanizate desired, and the like. However, in general we have found that in many instances the quantity will be substantially less than ordinarily employed with conventional type accelerators heretofore used such as, for example, the widely used N-cyclohexyl-2-benzothiazolesulfenamide.

As is indicated from the discussion and disclosure contained herein, except for the use of our novel vulcanization accelerators, and various effects directly resulting therefrom, other factors of the practice of our invention are in accordance with vulcanization procedures well known to those skilled in the art. The actual vulcanization agent is usually sulfur, which is intimately admixed with the raw rubber in amounts between about 0.5 and 15 parts, based on 100 parts of rubber. The mixture to be vulcanized will also usually contain a substantial amount of carbon black and small amounts of a softener, such as asphalt, and a material, such as zinc oxide. Such components, and their proportions, are very familiar to those skilled in the art, and although the actual species and amounts of such materials which may be used in any particular instance will depend to a large extent upon the ultimate use for the vulcanized product, their determination, per se, is well within the ordinary skill of the available technical worker. This invention has been successfully applied to natural rubber and to various synthetic rubbers, particularly those which are unsaturated, such as are produced in whole or in part, from a conjugated diolefin, as 1,3-butadiene and its homologues and analogues, chloroprene and its homologues and analogues, etc.

Advantages of this invention are illustrated by the following examples. The reactants and their proportions and the other specific ingredients of the recipe are presented as being typical and should not be construed to limit the invention unduly.

EXAMPLE 1

Synthetic rubber (GR–S) was compounded in accordance with the following recipe:

| | Parts by weight |
|---|---|
| GR–S | 100 |
| Carbon black [1] | 50 |
| Zinc oxide | 3 |
| Sulfur | 2 |
| Asphalt softener | 6 |
| Accelerator | variable |

[1] Spent, furnace-type, high modulus carbon black.

Four different accelerators were employed, namely, N,N-dimethyl-S-tert-butyl thiosulfenyl dithiocarbamate, piperidine-S-tert-butyl thiosulfenyl dithiocarbamate, benzothiazyl disulfide, and 2-mercaptobenzothiazole, the latter two being used for comparative purposes. The mixes were milled and cured for varying lengths of time at 307° F. Stress-strain properties, measured at 80° F. for the cured rubbers are tabulated immediately below.

Example 1.—Stress-strain properties at 80° F.

| Accelerator | PHR[1] | Comparison at 15 Per Cent Compression Set at 30 Minutes at 307° F. | | | | | | Oven Aged 24 Hours at 212° F. | | | |
|---|---|---|---|---|---|---|---|---|---|---|---|
| | | Scorch, Minutes at 280° F. | Minimum Mooney Value | 300 Per Cent Modulus, p. s. i. | Tensile, p. s. i. | Elongation, Per Cent | Resilience, Per Cent | 300 Per Cent Modulus, p. s. i. | Tensile, p. s. i. | Elongation, Per Cent | Resilience, Per Cent |
| N,N-dimethyl-S-tert-butylthiosulfenyl dithiocarbamate | 0.95 | 7 | 48 | 2,200 | 3,250 | 420 | 61 | ---------- | 2,900 | 310 | 65.5 |
| piperidine-S-tert-butylthiosulfenyl dithiocarbamate | 1.2 | 9 | 47 | 2,400 | 3,170 | 380 | 61 | ---------- | 3,050 | 280 | 67.6 |
| benzothiazyl disulfide | 1.8 | 8+ | 46 | 2,200 | 3,080 | 400 | 63 | ---------- | 2,980 | 280 | 68.0 |
| 2-mercaptobenzothiazole | >2.0 | 5+ | 48 | 1,700 | 2,810 | 440 | 58 | ---------- | 2,700 | 295 | 63.0 |

[1] Parts per hundred parts of rubber.

Compression set data are tabulated as follows.

Compression set data

[35 per cent deflection for 2 hours at 212° F. plus 1 hour relaxation at 212° F.]

| Accelerator | PHR[1] | Per Cent Compression Set Minutes Cure at 307° F. | | | | |
|---|---|---|---|---|---|---|
| | | 10 | 20 | 30 | 45 | 75 |
| N,N-dimethyl-S-tert-butylthiosulfenyl dithiocarbamate. | 0.5 | 79.2 | 43.4 | 29.3 | 16.4 | 9.2 |
| | 1.0 | 62.2 | 20.9 | 12.0 | 6.8 | 4.4 |
| | 1.5 | 44.0 | 12.8 | 7.7 | 5.0 | 3.0 |
| | 2.0 | 34.5 | 9.1 | 5.8 | 3.6 | 2.5 |
| piperidine-S-tert-butyl-thiosulfenyl dithiocarbamate. | 0.5 | 75.3 | 61.9 | 41.5 | 23.8 | 11.4 |
| | 1.0 | 86.1 | 30.6 | 17.5 | 8.8 | 5.1 |
| | 1.5 | 61.9 | 16.3 | 9.8 | 5.8 | 3.5 |
| | 2.0 | 46.5 | 12.4 | 7.3 | 4.4 | 2.7 |
| benzothiazyl disulfide | 0.5 | 67.5 | 40.4 | 29.0 | 19.7 | 12.1 |
| | 1.0 | 67.1 | 30.7 | 21.9 | 15.2 | 8.4 |
| | 1.5 | 58.0 | 26.7 | 17.3 | 12.3 | 6.6 |
| | 2.0 | 58.9 | 20.2 | 14.0 | 9.3 | 5.0 |
| 2-mercaptobenzothiazole. | 0.5 | 64.2 | 41.8 | 30.8 | 22.1 | 11.8 |
| | 1.0 | 64.1 | 37.7 | 24.1 | 15.2 | 8.5 |
| | 1.5 | 58.1 | 37.0 | 22.6 | 14.2 | 7.4 |
| | 2.0 | 54.4 | 31.2 | 20.8 | 12.4 | 6.7 |

[1] Parts per hundred parts of rubber.

EXAMPLE 2

Twelve batches of natural rubber (smoked sheet) were compounded according to the following recipe:

| | Parts by weight |
|---|---|
| Natural rubber | 100 |
| Carbon black[1] | 50 |
| Zinc oxide | 4 |
| Stearic acid | 3 |
| Asphalt softener | 6 |
| Sulfur | 2.5 |
| Phenyl-beta-naphthylamine | 1.5 |
| Accelerator | Variable |

[1] A special, furnace-type, high modulus carbon black.

Two different accelerators were employed, namely, N,N-dimethyl-S-tertiary-butylthiosulfenyl dithiocarbamate and mercaptobenzothiazole, the latter being used for comparative purposes. Four batches of the rubber stock containing variable quantities of each accelerator were compounded. The mixes were milled and cured for varying lengths of time at 307° F. Results of evaluation tests on the cured rubbers are herewith presented.

Stress-strain properties at 80° F.

| Accelerator | PHR[1] | Min. Cure at 307° F. | 300% Modulus, p. s. i. | Tensile, p. s. i. | Elongation, Per Cent | Resilience, Per Cent | Compression Set, Per Cent[2] | Scorch, Min. at 307° F. |
|---|---|---|---|---|---|---|---|---|
| N,N-dimethyl-S-tertiary-butyl-thiosulfenyl dithiocarbamate | 0.2 | 10 | 870 | 3,130 | 610 | 65.4 | 48.8 | 3.5 |
| | | 20 | 1,020 | 2,770 | 565 | | 35.2 | |
| | | 30 | 1,030 | 2,530 | 515 | | 31.1 | |
| | | 45 | 1,090 | 2,220 | 490 | | 27.8 | |
| | | 75 | 760 | 1,970 | 520 | | 28.0 | |
| | 0.4 | 10 | 1,300 | 3,730 | 619 | 68.4 | 44.7 | 2.75 |
| | | 20 | 1,380 | 3,510 | 575 | | 32.4 | |
| | | 30 | 1,340 | 3,420 | 570 | | 25.6 | |
| | | 45 | 1,130 | 2,690 | 535 | | 24.0 | |
| | | 75 | 650 | 1,890 | 550 | | 21.3 | |
| | 0.6 | 10 | 1,550 | 3,950 | 580 | 69.3 | 43.5 | 2.75 |
| | | 20 | 1,590 | 3,750 | 540 | | 27.7 | |
| | | 30 | 1,450 | 3,380 | 535 | | 18.5 | |
| | | 45 | 990 | 2,500 | 525 | | 12.3 | |
| | | 75 | 850 | 2,100 | 520 | | 12.8 | |
| | 1.0 | 10 | 1,800 | 4,220 | 560 | 70.9 | 30.0 | 2.5 |
| | | 20 | 1,680 | 3,670 | 535 | | 14.1 | |
| | | 30 | 1,540 | 3,460 | 530 | | 9.4 | |
| | | 45 | 1,450 | 3,110 | 520 | | 8.0 | |
| | | 75 | 1,270 | 2,840 | 515 | | 6.8 | |
| Mercaptobenzothiazole | 0.2 | 10 | 840 | 2,690 | 590 | 68.9 | 64.5 | 2.5+ |
| | | 20 | 1,260 | 3,110 | 540 | | 43.2 | |
| | | 30 | 1,310 | 2,720 | 490 | | 32.5 | |
| | | 45 | 1,330 | 2,750 | 500 | | 24.2 | |
| | | 75 | 1,140 | 2,375 | 490 | | 14.4 | |
| | 0.4 | 10 | 1,220 | 3,370 | 577 | 72.6 | 56.6 | 2.25 |
| | | 20 | 1,520 | 3,630 | 535 | | 36.3 | |
| | | 30 | 1,570 | 3,630 | 535 | | 22.7 | |
| | | 45 | 1,470 | 3,410 | 535 | | 14.5 | |
| | | 75 | 1,330 | 3,120 | 520 | | 9.5 | |
| | 0.6 | 10 | 1,400 | 3,560 | 600 | 72.8 | 50.6 | 2.25— |
| | | 20 | 1,550 | 3,450 | 525 | | 30.4 | |
| | | 30 | 1,570 | 3,500 | 525 | | 17.4 | |
| | | 45 | 1,510 | 3,210 | 505 | | 11.2 | |
| | | 75 | 1,470 | 3,320 | 525 | | 7.9 | |
| | 1.0 | 10 | 1,530 | 3,670 | 535 | 73.8 | 44.2 | 2.0 |
| | | 20 | 1,720 | 3,880 | 535 | | 23.6 | |
| | | 30 | 1,700 | 3,710 | 525 | | 12.8 | |
| | | 45 | 1,710 | 3,700 | 520 | | 9.0 | |
| | | 75 | 1,570 | 3,220 | 500 | | 7.0 | |

[1] Parts per 100 parts of rubber.
[2] A measure of state of cure. Low compression set values indicate more complete cure.

EXAMPLE 3

The vulcanization accelerating activity of N,N-dimethyl-S-tert-butylthiosulfenyl dithiocarbamate was investigated at vulcanization temperatures of 280 and 260° F. and compared with those of mercaptobenzothiazole, as control. The compounding recipe of Example 1 was employed. Varied amounts of both the control compound and the novel accelerator compound were used. Evaluation data were determined at approximately equivalent states of cure as measured by compression set values. The following tabulation is a summary of the results obtained.

| | 17 Per Cent Compression Set, 75 Min. Cure, 280° F. | | | |
|---|---|---|---|---|
| | PHR[1] | 300 Per Cent Modulus, p.s.i. | Tensile p.s.i. | Elongation, Per Cent |
| N,N-dimethyl-S-tertiary butylthiosulfenyl dithiocarbamate. | 0.5 | 1,535 | 3,730 | 560 |
| Mercaptobenzothiazole... | 0.6 | 1,670 | 4,000 | 515 |

[1] Parts per hundred parts of rubber.

| | 17 Per Cent Compression Set, 150 Min. Cure, 260° F. | | | |
|---|---|---|---|---|
| | PHR[1] | 300 Per Cent Modulus, p.s.i. | Tensile p.s.i. | Elongation, Per Cent |
| N,N-dimethyl-S-tertiary butylthiosulfenyl dithiocarbamate. | 0.4 | 1,730 | 3,740 | 505 |
| Mercaptobenzothiazole... | 0.4 | 1,880 | 3,890 | 490 |

[1] Parts per 100 parts rubber.

| | 28 Per Cent Compression Set, 30 Min. Cure, 280° F. | | | |
|---|---|---|---|---|
| | PHR[1] | 300 Per Cent Modulus, p.s.i. | Tensile p.s.i. | Elongation, Per Cent |
| N,N-dimethyl-S-tertiary butylthiosulfenyl dithiocarbamate. | 0.6 | 1,820 | 4,100 | 510 |
| Mercaptobenzothiazole... | 1.0 | 1,540 | 3,920 | 540 |

[1] Parts per hundred parts of rubber.

| | 46 Per Cent Compression Set, 30 Min. Cure, 260° F. | | | |
|---|---|---|---|---|
| | PHR[1] | 300 Per Cent Modulus, p.s.i. | Tensile p.s.i. | Elongation, Per Cent |
| N,N-dimethy-S-tertiary-butylthiosulfenyl dithiocarbamate. | 0.6 | 1,910 | 4,640 | 560 |
| Mercaptobenzothiazole... | 1.0 | 1,590 | 4,230 | 570 |

[1] Parts per hundred parts of rubber.

The alkylthiosulfenyl dithiocarbamate shows no loss in activity at these temperatures, i. e., 260 to 280° F., which are lower than those of Example 1.

EXAMPLE 4

Natural rubber (smoked sheet) was compounded in accordance with the recipe of Example 2. N,N-dimethyl-S-tert-butylthiosulfenyl dithiocarbamate, piperidine-S-tert-butylthiosulfenyl dithiocarbamate, benzothiazyl disulfide, and 2-mercaptobenzothiazole were employed as accelerators, the latter two being used for comparative purposes. The mixes were milled and cured for varying lengths of time at 307° F. Stress-strain properties measured at 80° F., for the cured rubbers are tabulated as follows.

*Stress-strain properties at 80° F.*

| Accelerator | PHR[1] | Scorch, Minutes at 250° F. | Minimum Mooney Value | 300 Per Cent Modulus, p.s.i. | Tensile, p.s.i. | Elongation, Per Cent | Resilience, Per Cent |
|---|---|---|---|---|---|---|---|
| COMPARISON AT 20 PER CENT COMPRESSION SET AT 30 MINUTES AT 307° F. | | | | | | | |
| N,N-dimethyl-S-tert-butylthiosulfenyl dithiocarbamate | 0.4 | 8+ | 47 | 1,380 | 3,330 | 545 | 71.3 |
| piperidine-S-tert-butylthiosulfenyl dithiocarbamate | 0.4 | 8 | 53 | 1,590 | 3,630 | 565 | 69.9 |
| benzothiazyl disulfide | 0.4 | 9 | 55 | 1,580 | 3,550 | 530 | 72.9 |
| 2-mercaptobenzothiazole | 0.35 | 7 | 60 | 1,580 | 3,340 | 525 | 72.5 |
| COMPARISON AT 40 PER CENT COMPRESSION SET AT 10 MINUTES AT 307° F. | | | | | | | |
| N,N-dimethyl-S-tert-butylthiosulfenyl dithiocarbamate | 0.4 | 8+ | 47 | 1,390 | 3,730 | 595 | |
| piperidine-S-tert-butylthiosulfenyl dithiocarbamate | 0.8 | 7+ | 52 | 1,980 | 4,000 | 550 | |
| benzothiazyl disulfide | 0.9 | 9 | 55 | 1,800 | 4,000 | 545 | |
| 2-mercaptobenzothiazole | 0.7 | 5+ | 62 | 1,850 | 3,950 | 535 | |

[1] Parts per hundred parts of rubber.

Compression set data for these cured rubbers are tabulated as follows.

*Compression set data*

[35 per cent deflection for 2 hours at 212° F. plus 1 hour relaxation at 212° F.]

| Accelerator | PHR[1] | Per Cent Compression Set Minutes Cure at 307° F. | | | | |
|---|---|---|---|---|---|---|
| | | 10 | 20 | 30 | 45 | 75 |
| N,N-dimethyl-S-tert-butylthiosulfenyl dithiocarbamate. | 0.2 | 47.6 | 27.9 | 23.8 | 22.2 | 21.5 |
| | 0.4 | 41.1 | 24.5 | 20.7 | 17.2 | 13.4 |
| | 0.6 | 40.7 | 14.6 | 12.2 | 9.3 | 7.9 |
| | 1.0 | 23.8 | 10.4 | 7.4 | 6.6 | 5.8 |
| piperidine-S-tert-butylthiosulfenyl dithiocarbamate. | 0.2 | 51.4 | 27.2 | 22.8 | 20.9 | 19.3 |
| | 0.4 | 49.9 | 27.8 | 21.9 | 18.1 | 13.0 |
| | 0.6 | 47.5 | 22.4 | 11.8 | 11.1 | 9.2 |
| | 1.0 | 30.2 | 11.6 | 8.4 | 7.3 | 6.2 |
| benzothiazyl disulfide. | 0.2 | 56.3 | 35.3 | 27.6 | 21.5 | 12.0 |
| | 0.4 | 49.8 | 23.9 | 20.7 | 13.8 | 8.4 |
| | 0.6 | 43.6 | 23.1 | 14.9 | 10.0 | 6.9 |
| | 1.0 | 38.5 | 17.5 | 10.8 | 7.6 | 4.4 |
| 2-mercaptobenzothiazole. | 0.2 | 54.3 | 32.5 | 25.5 | 19.4 | 11.0 |
| | 0.5 | 46.5 | 26.7 | 17.9 | 12.1 | 7.8 |
| | 0.6 | 42.7 | 21.8 | 14.5 | 9.5 | 6.1 |
| | 1.0 | 36.3 | 16.2 | 10.4 | 7.5 | 5.9 |

[1] Parts per hundred parts of rubber.

As will be evident, to those skilled in the art, various modifications of this invention can be made, or followed, in the light of the foregoing disclosure and discussion without departing from the spirit or scope of the disclosure or the claims.

We claim:
1. The process of claim 10 wherein said substance comprises a polymer of a conjugated diolefin.
2. The process of claim 10 in which said accelerator is an N,N-dialky-S-tert-alkylthiosulfenyl dithiocarbamate.
3. The vulcanized substance resulting from the process of claim 10.
4. The product of vulcanization of natural rubber which has been vulcanized with sulfur in the presence of 0.05 to 5 parts, by weight, per 100 parts by weight of said natural rubber, of a vulcanization accelerator compound of the formula

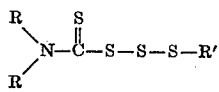

wherein each R is of the group consisting of hydrogen, hydrocarbon radicals, and radicals which together form a divalent radical selected from the group consisting of alkylene and oxaalkylene, said divalent radical forming a heterocyclic ring with the nitrogen, but with not more than one R being hydrogen, and wherein R' is an alkyl hydrocarbon radical.
5. The product of vulcanization of natural rubber which has been vulcanized with sulfur in the presence of 0.05 to 5 parts, by weight, per 100 parts of said rubber, of N,N-dimethyl-S-tertiary-butylthiosulfenyl dithiocarbamate as a vulcanization accelerator.
6. A composition comprising a rubber copolymer of butadiene and styrene with sufficient sulfur for vulcanization and with 0.05 to 5 parts, by weight, per 100 parts of rubber, of N,N-dimethyl-S-tert-butylthiosulfenyl dithiocarbamate intimately admixed therewith.
7. An improved process for vulcanizing with sulfur a butadiene-styrene copolymer synthetic rubber, which comprises admixing with such a synthetic rubber as a vulcanization accelerator an N,N - dialkyl - S - alkylthiosulfenyl dithiocarbamate, where the total number of carbon atoms in the dialkyl is not greater than 20 and in the alkyl is not greater than 16, in an amount between 0.05 and 5 parts, by weight, per 100 parts of rubber, and vulcanizing the resulting rubber-accelerator admixture.
8. An improved process for vulcanizing natural rubber with sulfur which comprises admixing with said natural rubber as a vulcanization accelerator an N,N-dialkyl-S-alkylthiosulfenyl dithiocarbamate, where the total number of carbon atoms in the dialkyl is greater than 20 and in the alkyl is not greater than 16, in an amount between 0.05 and 5 parts by weight per 100 parts of rubber, and vulcanizing the resulting rubber-accelerator admixture.
9. The process of claim 8 wherein the accelerator is N,N-dimethyl-S-tert-butylthiosulfenyl dithiocarbamate.
10. An improved process for vulcanizing a sulfur-vulcanizable organic plastic substance containing unsaturated carbon to carbon bonds, with sulfur, which comprises admixing with such a substance to be vulcanized, as a vulcanization accelerator and in an amount between 0.05 and 5 parts by weight, per 100 parts by weight of said substance, a compound of the formula

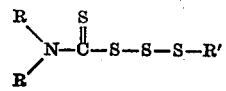

wherein each R is of the group consisting of hydrogen, hydrocarbon radicals, and radicals which together form a divalent radical selected from the group consisting of alkylene and oxaalkylene, said divalent radical forming a heterocyclic ring with the nitrogen, but with not more than one R being hydrogen, and wherein R' is an alkyl hydrocarbon radical, and vulcanizing the resulting organic plastic substance-accelerator admixture.
11. The process of claim 10 wherein said accelerator is morpholine-S-tert-butylthiosulfenyl dithiocarbamate.
12. The vulcanized substance resulting from the process of claim 11.
13. A composition comprising a synthetic rubber copolymer of butadiene and styrene with sufficient sulfur for vulcanization and with 0.05 to 5 parts by weight, per 100 parts by weight of said copolymer, of a vulcanization accelerator compound having the structural formula

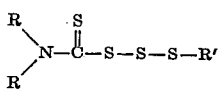

wherein each R is of the group consisting of hydrogen, hydrocarbon radicals, and radicals which together form a divalent radical selected from the group consisting of alkylene and oxaalkylene, said divalent radical forming a heterocyclic ring with the nitrogen, but with not more than one R being hydrogen, and wherein R' is an alkyl hydrocarbon radical.
14. A composition comprising natural rubber together with sufficient sulfur for vulcanization and with 0.05 to 5 parts by weight, per 100 parts by weight of said natural rubber, of piperidine-S-tert-butylthiosulfenyl dithiocarbamate.
15. An improved process for vulcanizing natural rubber with sulfur which comprises admixing with said natural rubber as a vulcanization accelerator, from 0.05 to 5 parts by weight of piperidine - S - tert - butylthiosulfenyl dithiocarbamate per 100 parts by weight of said natural rubber, and vulcanizing the resulting rubber-accelerator admixture.
16. An improved process for vulcanizing a butadiene-styrene copolymer synthetic rubber with sulfur which comprises admixing with such a synthetic rubber as a vulcanization accelerator from 0.05 to 5 parts by weight of piperidine-S-tert-butylthiosulfenyl dithiocarbamate per 100 parts by weight of said rubber, and vulcanizing the resulting synthetic rubber-accelerator admixture.
17. A composition comprising a rubber copolymer of butadiene and styrene with sufficient sulfur for vulcanization and with 0.05 to 5 parts by weight of piperidine - S - tert - butylthiosulfenyl dithiocarbamate per 100 parts by weight of said copolymer.
18. An improved process for vulcanizing a synthetic rubber butadiene-styrene copolymer with sulfur, which comprises admixing with such a synthetic rubber as a vulcanization accelerator from 0.05 to 5 parts by weight of N,N-dimethyl-S-tert-butylthiosulfenyl dithiocarbamate, per 100 parts by weight of said rubber, and vulcanizing the resulting synthetic rubber-accelerator admixture.

CHESTER M. HIMEL.
LEE O. EDMONDS.

No references cited.